Patented Dec. 8, 1936

2,063,450

UNITED STATES PATENT OFFICE 2,063,450

PRODUCTION OF ETHYL ALCOHOL AND ACETONE BY FERMENTATION

David A. Legg, Terre Haute, Ind., assignor to Commercial Solvents Corporation, Terre Haute, Ind., a corporation of Maryland No Drawing. Application February 12, 1934, Serial No. 710,900

2 Claims. (Cl. 195—45)

My invention relates to the production of ethyl alcohol and acetone by the fermentation of amylaceous mashes. More specifically, my invention relates to the production of these compounds by the fermentation of cereal mashes by means of certain bacteria of the general type *Bacillus acetoethylicum* under certain fermentation conditions designated herein.

It has previously been known that carbohydrate mashes could be fermented with the production of acetone and ethyl alcohol as the major products. U. S. Patent 1,293,172 by John H. Northrup discloses a specific strain of bacteria designated as *Bacillus aceto-ethylicum* which yields substantial amounts of these materials by the fermentation of either amylaceous or saccharine mashes. However, the process of this patent has a number of distinct disadvantages from a technical standpoint, especially as applied to amylaceous mashes. The process as described in the patent necessitated the use of supporting material in the fermentation vessel and a semi-continuous fermentation cycle. This obviously is disadvantageous from the standpoint of economy of space, difficulty from contamination, etc. A much more important drawback from a commercial standpoint is the fact that the concentration of products in the fermented mash reported for the fermentation of amylaceous mashes by this process are relatively low, necessitating a much more expensive recovery process than is desirable for a commercial fermentation. This latter point is of the utmost importance, since a low concentration of products in the mash not only necessitates greater expense in recovery, but also requires a greater amount of fermenting equipment for the production of a given amount of material.

I have now discovered that by the use of a particular combination of fermentation conditions, especially the presence of ammonia nitrogen, as for example, an ammonium salt, and an insoluble neutralizing agent in the mash, high yields of acetone and ethyl alcohol can be produced from amylaceous mashes with concentrations of these products in the fermentation liquor almost double those reported by Northrup. My process has the further advantage that supporting material in the fermentation vessel is not necessary and the fermentation may be carried out in the usual batch method. Losses from contamination are thus almost entirely eliminated. With the elimination of the packing material in the fermenters and the increase in concentration of solvents secured, it may be seen that a given quantity of products may be produced by my process with far less equipment than was required by the Northrup procedure.

The bacteria employed in my process are of the general type *Bacillus aceto-ethylicum*, but differ in certain characteristics, and particularly in their nitrogen requirements, from previously described strains of this type. The strains previously known have been described as being unable to utilize ammonium salts when starch constitutes the principal carbohydrate source. The recommended source of nitrogen under these circumstances was protein or peptone. The bacteria as employed in my process, however, have been found to require ammonium salts for the production of the highest concentrations of solvents, and to be unable to produce high yields with whole protein as the sole source of nitrogen. The following example will illustrate the nitrogenous requirements of the organisms under my fermentation conditions: The fermentations were carried out in corn mash with and without ammonium sulphate or additional corn germ meal as the source of nitrogen. The mash in each case was prepared from degerminated corn meal to which the oil press cake had been returned. The material thus contained substantially all of the original nitrogen content of the corn. The mesh was prepared in a concentration of approximately 6.9% of this meal (dry weight) and contained approximately 0.6% of calcium carbonate on the total weight of the mash. Duplicate flasks of each medium were inoculated with a culture of the type *Bacillus aceto-ethylicum* having the characteristics herein described, which I have designated herein as *Bacillus aceto-ethylicum* α, and were incubated at 42° C. for 88 hours. The concentration of solvents produced and the yield on the basis of starch content of the mash are reported below.

Table I

| Fermentation No. | Corn germ meal, weight percent of mash | $(NH_4)_2SO_4$, weight percent of mash | Yield of acetone and ethyl alcohol | |
|---|---|---|---|---|
| | | | Concentration, grams per liter | Yield, weight percent of starch |
| 1 | 0.0 | 0.0 | 8.5 | 17.1 |
| 2 | 0.2 | 0.0 | 7.8 | 14.3 |
| 3 | 0.0 | 0.15 | 18.1 | 36.3 |

The nitrogen metabolism of the strains of bacteria suitable for my process is further illustrated by the following example. In this case the mash was prepared from pure starch instead of cereal, and had the following composition:

| | Percent |
|---|---|
| Starch | 2.5 |
| $K_2HPO_4$ | 0.07 |
| $KH_2PO_4$ | 0.06 |
| $MgSO_4$ | 0.1 |
| $CaCO_3$ | 0.6 |

The mash was made up with tap water, the above concentrations being based upon the total weight of the mash. The fermentations were carried out as in the previous example, and the yields obtained when using different nitrogen sources are reported below:

Table II

| Fermentation No. | Corn germ meal, weight percent of mash | (NH₄)₂SO₄, weight percent of mash | Yield of acetone and ethyl alcohol | |
|---|---|---|---|---|
| | | | Concentration, grams per liter | Yield, weight percent of starch |
| 1 | 0.2 | 0.0 | 4.2 | 16.9 |
| 2 | 0.0 | 0.3 | 6.0 | 24.0 |
| 3 | 0.2 | 0.3 | 7.6 | 30.3 |

It may be seen from the above examples that the bacteria, as employed in my process, not only possess the ability to utilize ammonia nitrogen in pure starch mashes or essentially starchy mashes such as cereal mashes, but actually require the presence of this form of nitrogen for the production of optimum yields. The bacteria which are suitable for my process may, therefore, be briefly defined as bacteria of the type *Bacillus aceto-ethylicum* which are characterized by their ability to utilize ammonia nitrogen in essentially starchy mashes. My invention applies to the use of any such bacteria, whether newly isolated, or whether old strains which are now found to have this characteristic under my fermentation conditions, irrespective of contrary indications in the literature. It is to be understood, of course, that my invention applies to such previously known bacteria only under the fermentation conditions specified and claimed herein, and not under other conditions which may previously have been employed.

The bacteria suitable for my process may therefore be briefly described by the following characteristics:

I. Morphological
    A. Form—rod-shaped
    B. Spores—terminal

II. Biochemical
    A. Carbohydrate fermentation
        1. Ability to ferment starches and simple sugars with the production of acetone and ethyl alcohol as the major products.
        2. Ability to produce high yields and high solvent concentrations in the mash from cereal meal as the only source of carbohydrate.
    B. Nitrogen requirements
        1. Ability to utilize whole protein, degraded protein and ammonia as nitrogen sources in cereal mashes.
        2. Inability to produce high yields and high concentrations of solvents from cereal mashes containing whole protein as the sole nitrogen source.
        3. Ability to produce high yields and high concentration of solvents from cereal mashes containing ammonia as the principal source of nitrogen.
    C. Oxygen requirements
        1. Anaerobic—but will ferment satisfactorily under substantially aerobic conditions due to anaerobic conditions maintained in the main body of the fermenting mash.
    D. Temperature range for solvent production
        1. From 35° C. to 45° C., usually 38° C. to 43° C.
    E. Hydrogen ion concentration for solvent production
        1. pH 5.0 to 8.5, preferably 5.7 to 6.5.

The above outline is believed to be sufficient to enable one skilled in the art to identify the organisms in question. A complete characterization such as that of the Descriptive Chart of the Society of American Bacteriologists would not only be unnecessary but would be confusing since different members of this group of organisms would vary in a number of minor particulars having no bearing upon the present case. All organisms having in common the above characteristics come within the scope of this invention, irrespective of further properties which they may possess. This applies equally to prior art organisms and to cultures which may be isolated for this purpose; but of course it is to be understood that my invention applies to the use of prior art bacteria only under the specific fermentation conditions disclosed and claimed herein.

The organisms of this group are widely distributed in nature and may be isolated from such sources as soil, corn, potatoes, and the like. Of course, as is apparent to one skilled in the art, these organisms cannot be isolated from every sample of material tested. However, if a number of different materials are tried, a good culture will nearly always be secured. The usual methods of isolation may be employed, such, for example, as enrichment in the ammonium sulphate corn mash medium of the example given above. A further purification or selection may be effected by the known plating methods, which may be applied to newly isolated enrichment cultures or to old cultures of this general type. The cultures resulting from such enrichment or purification procedures may then be tested on the preferred medium, i. e. corn mash containing ammonium sulphate and calcium carbonate, to see if the requirements of the above outline of characteristics are satisfied. An accurate characterization of the cultures is possible by this procedure, but those skilled in the art are usually sufficiently familiar with this group of organisms so that the cultures suitable for use in the present invention may be briefly defined as bacteria of the type *Bacillus aceto-ethylicum* α characterized by their ability to utilize ammonia nitrogen in essentially amylaceous mashes.

In carrying out my invention the amylaceous mashes may be prepared with a starch content as high as that of a 7% corn mash or even higher in some cases. To this mash is added a small amount, e. g. 0.05% to 0.2%, of an ammonium salt such as ammonium sulphate, ammonium phosphate or the like. In general it is preferred to use approximately 0.15% of ammonium sulphate based on the total weight of the mash. A basic insoluble non-toxic neutralizing agent such as calcium carbonate, barium carbonate or the like is then added to the mash in a concentration slightly in excess of that necessary to neutralize initial acidity. For most purposes from 0.3 to 0.6% of calcium carbonate, based on the weight of the mash, will be found to be satisfactory. The initial hydrogen ion concentration of the mash may advantageously be adjusted to a value of pH 7.0 to 7.5, but this step is not necessary. If a purified form of starch is utilized as the principal source of carbohydrate, it will be advantageous to introduce further nitrogenous material in the form of proteins or degraded forms of protein. Materials such as corn gluten, corn germ meal, steep water, yeast water or the like will be suitable for this purpose. However, in the case of cereal mashes nitrogenous material of this nature is usually present, so that the ammonium salt will be the only additional material required. Although various other grains are suitable for use in my invention, it is desirable to utilize corn, preferably in a mash having the following approximate composition:

| | Per cent |
|---|---|
| Whole corn meal | 7 dry weight |
| Ammonium sulphate | 0.15 on weight of mash |
| Calcium carbonate | 0.6 on weight of mash |

The temperature at which fermentation is carried out will usually lie between 38° C. and 43° C., but the specific temperature will depend upon the optimum value for the particular strain of bacteria employed.

The method for carrying out my invention may perhaps best be illustrated by the following specific example: A corn mash of 6.65% concentration (dry basis) was prepared by cooking the required amount of corn with water to which had been added ammonium sulphate equal to 0.15% of the mash, and calcium carbonate equal to 0.6% of the mash. This cooking step was carried out in the known manner and was followed by sterilization for about two hours at 20 lbs. pressure. The mash was then cooled to 42° C. and inoculated with 4% of a third generation 24 hour culture of the bacteria to be employed. The strains utilized in this particular case were isolated by anaerobic plating from old cultures of the type Bacillus aceto-ethylicum. The inoculated mash was incubated at 42° C. for 90 hours and the products determined at 72 hours and 90 hours. The results of these fermentations are given in the table below.

Table III

| Fermentation No. | Strain of bacteria | 72 hours | | 90 hours | | Solvent ratio | |
|---|---|---|---|---|---|---|---|
| | | Concentration of solvents, grams per liter | Yield of solvents, percent on weight of starch | Concentration of solvents, grams per liter | Yield of solvents, percent on weight of starch | Acetone, percent by weight | Ethyl alc., percent by weight |
| 1 | D | 17.8 | 37.0 | 19.2 | 40.2 | 26.7 | 73.3 |
| 2 | B | 18.9 | 39.4 | 19.8 | 41.2 | 27.0 | 73.0 |
| 3 | B | 18.9 | 39.4 | 20.6 | 43.0 | 27.0 | 73.0 |

A further aspect of my invention comprises the discovery that improved results are secured if the calcium carbonate or other insoluble neutralizing agent employed comprises a material substantially more finely divided than the usual grades of such materials previously employed in fermentations requiring regulation of hydrogen ion. The preferred types of finely divided neutralizing agents are described at length in co-pending application Ser. No. 710,897, filed February 12, 1934. These materials, such as calcium carbonate, may be briefly characterized, for use in the present process, as presenting an available surface during fermentation substantially greater than that presented by 300 mesh calcite. They may also be defined as having a rate of settling from aqueous suspension substantially slower than that of 300 mesh calcite, or having the average size of their particles and aggregates substantially less than that of 300 mesh calcite. By the term "substantially" in this connection is meant sufficiently to give rise to a measurable increase in yield when 300 mesh calcite and the finer material are compared in parallel fermentations under the same conditions. Among these finely divided forms freshly precipitated calcium carbonate is the preferred material. The advantages of the use of such a neutralizing agent are illustrated in the table below. The fermentations for which these results are reported were carried out in corn mash of 5.2% concentration (dry basis) containing 0.15% ammonium sulphate and 0.6% of different grades of calcium carbonate. The mash was inoculated in the usual manner and incubated at 42° C. for 92 hours.

Table IV

| Fermentation No. | Strain of bacteria | Calcium carbonate | Solvent concentration, grams per liter | Yield, weight pe of starch |
|---|---|---|---|---|
| 1 | A | 50 mesh ground calcite. | 12.6 | 33.6 |
| 2 | A | 100 mesh ground calcite. | 13.2 | 34.7 |
| 3 | A | 300 mesh ground calcite. | 13.2 | 34.7 |
| 4 | A | Precipitated calcium carbonate. | 14.9 | 36.7 |
| 5 | A | None | 4.6 | 12.4 |

Although all of the yields in the above table are lower than those reported in Table II, due to the lower activity of the particular strain employed, the improvement in yield due to the use of finely divided calcium carbonate may readily be seen. It will be seen that an increase in solvent concentration amounting to about 16% is obtained when precipitated calcium carbonate is utilized in place of ground calcite. In large scale commercial fermentations over an extended period of time this constitutes an enormous saving, both in cost of raw material and in apparatus and recovery costs.

It is to be understood, of course, that the examples given above, by way of illustration, are not to be taken as limiting my invention to the specific materials or methods employed. For example, other starchy materials may be utilized, as, for example, rye or other grains, potato starch, cassava, or the like. When the starchy material employed is deficient in nitrogenous content, any of the usual nutrient materials of this type may be utilized to supplement the ammonium salts employed in the present invention. The hydrogen ion control, also, may be effected by means of materials other than those specifically mentioned. For example, other non-toxic materials which are substantially water-insoluble may be employed, or soluble materials may be used if they are added in such a manner as to simulate the effect of the insoluble materials in the amounts specified. In general it may be said that equivalents and modifications of procedure which would naturally occur to one skilled in the art may be employed without departing from the scope of my invention.

My invention now having been described, what I claim is:

1. In the art of fermenting amylaceous mashes with the formation of acetone and ethyl alcohol as the major solvent products, the mash being maintained within a temperature range of 35–45° C. and the hydrogen ion concentration between pH 5.0 and 8.5, by means of the herein-described bacteria Bacillus aceto-ethylicum α, particularly characterized and differentiated by their ability to utilize ammonia nitrogen in essentially starch mashes; the method of increasing the yield of said solvents, over that secured by the normal activity of the said organisms in said mash, by the combined effect of fermenting said mash with said organism in the presence of a small amount of an ammonium salt of the order of 0.05% to 0.2%, calculated on the total weight of the mash and a finely divided non-toxic insoluble basic neutralizing agent, in an amount slightly in excess of that necessary to neutralize any initial acidity of the said mash.

2. The process of claim 1, in which the neutralizing agent has substantially the same degree of fineness and neutralizing properties as freshly precipitated calcium carbonate or the like.

DAVID A. LEGG.

CERTIFICATE OF CORRECTION.

Patent No. 2,063,450.   December 8, 1936.

DAVID A. LEGG.

It is hereby certified that error appears in the printed specification of the above numbered patent requiring correction as follows: Page 1, second column, line 21, for the word "mesh" read mash; page 3, second column, line 16, in the heading to the table, last column, for "pe" read percent; and that the said Letters Patent should be read with these corrections therein that the same may conform to the record of the case in the Patent Office.

Signed and sealed this 2nd day of March, A. D. 1937.

Henry Van Arsdale
Acting Commissioner of Patents.

(Seal)